Dec. 31, 1968    A. CHEVION    3,419,362
FLUID HEATER

Filed June 25, 1965    Sheet 1 of 2

ALEXANDER CHEVION

INVENTOR.

BY J. T. Choloty
AGENT

ALEXANDER CHEVION
INVENTOR.

United States Patent Office 3,419,362
Patented Dec. 31, 1968

3,419,362
FLUID HEATER
Alexander Chevion, Riverdale, N.Y., assignor to Chemical Construction Corporation, New York, N.Y., a corporation of Delaware
Filed June 25, 1965, Ser. No. 466,984
15 Claims. (Cl. 23—288)

ABSTRACT OF THE DISCLOSURE

A system is provided for maintaining uniform tension on each of a plurality of tubes in a fluid heater. A first pulley is connected to each tube, and a fixed second pulley is provided in proximity to two adjacent first pulleys. A connecting cable extends alternately below each first pulley and above each second pulley, and the cable is maintained under tension, so that the tubes are continuously maintained in tension when the furnace container of the fluid heater is at an elevated temperature.

---

Figure 1:
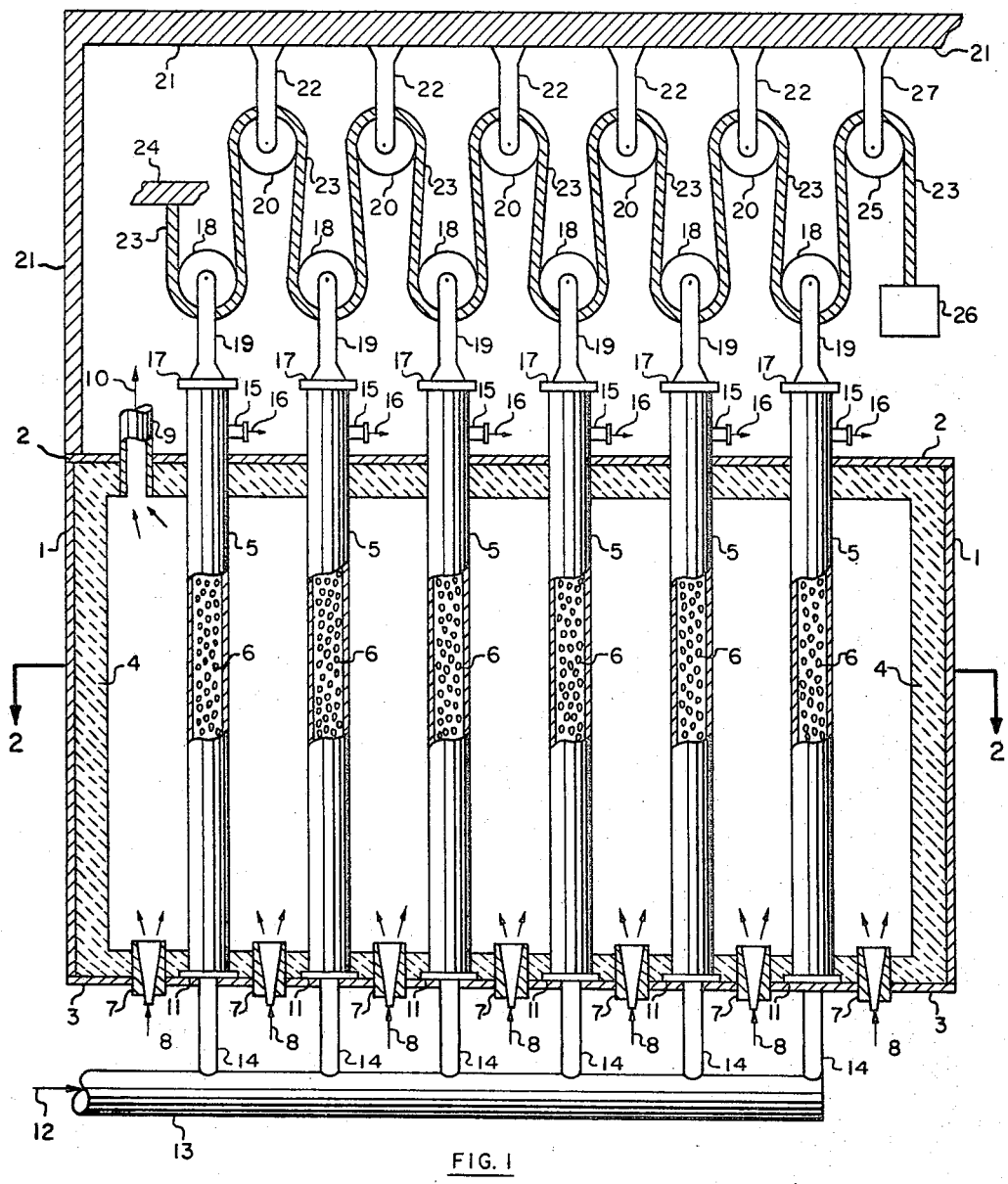

The present invention relates to fluid heaters employed in the heating of fluids to elevated temperature, usually with concomitant chemical reaction or transformation, and more particularly relates to hydrocarbon reform furnaces employed in the catalytic conversion of a gaseous mixture of steam and fluid hydrocarbon to synthesis gas. An improved tube suspension arrangement has been developed, which provides uniform and constant tension to the differentially expanding tubes through which the fluid is passed in the heater.

The apparatus concept of the present invention is generally applicable to all types of fluid heaters in which a fluid is passed through a plurality of tubes, which are vertically disposed in at least one linear row or bank of tubes in a container provided with heating means to externally heat the tubes. Numerous chemical processes employ fluid heaters of this type, to accomplish various types of chemical reactions or transformations, or merely to heat the fluid stream to an elevated temperature. In some cases a catalytic reaction is desired between components of the fluid stream, in which case the tubes will be packed with solid catalyst particles or granules. In other cases the tubes may be open and free of catalyst particles, as in the non-catalytic thermal cracking of fluid hydrocarbon streams at elevated temperature to produce a gas stream containing ethylene or propylene.

The apparatus of the present invention will be described in relation to the process of hydrocarbon conversion known as primary reforming, which is widely employed to produce synthesis gas and hydrogen. In this process, a gaseous fluid hydrocarbon such as methane or vaporized naphtha is catalytically reacted with steam at elevated temperatures, to produce a reformed gas mixture principally containing hydrogen, carbon monoxide and carbon dioxide. The reaction is preferably carried out at elevated pressures, although operation at substantially atmospheric pressure is also widely practiced. The overall reaction is endothermic, and consequently the usual procedure involves carrying out the reaction by passing the input gaseous mixture of hydrocarbon and steam through an externally heated group of tubes which are usually arranged in at least one row or bank of tubes, which is conventionally disposed in a furnace enclosure. The tubes are packed with solid catalyst granules, usually consisting of nickel or cobalt deposited on a suitable carrier. The resulting product reformed gas mixture is withdrawn from the tubes of the reformer unit, and then passed to further processing. The requisite heating is usually provided by burning a fluid hydrocarbon fuel with air in the furnace enclosure, external to the catalyst-filled reformer tubes. Other heating means such as electrical resistance-type units may also be employed for this purpose.

The reform reaction must be carried out at a highly elevated temperature, and consequently one of the problems encountered in operation of the reform apparatus is provision of adequate suspension or mounting of the tubes, to provide take-up tension to the plurality of tubes and thereby prevent sagging or buckling, and also to accommodate for differential expansion of the individual tubes. One prior art suspension arrangement for the tubes is described in U.S. Patent No. 2,660,519, and consists of rigidly mounting the tubes at their upper ends so that the tubes are freely suspended at their lower ends and may freely expand downwards under thermal deformation in service. This approach is objectionable because the entire weight of the tubes is concentrated at their upper end support, and in addition the tubes are not maintained in tension and therefore a certain amount of lateral thermal deformation may take place in elevated temperature service. Another prior art arrangement for mounting the tubes is described in U.S. Patent No. 3,172,739, and consists of rigidly mounting the tubes at their lower ends and attaching the upper ends of the tubes to individual tube mounting springs which accommodate for the differential expansion of individual tubes. The tube mounting springs are attached to a rigid support bar, which in turn is connected to a constant load spring which is attached to a fixed support element. The constant load spring exerts a constant tension pull on the rigid support bar, regardless of displacement, and thus exerts a constant and uniform tension on all of the tubes through the tube mounting springs. This arrangement is expensive due to the cost of the many springs which are involved, and is also open to objections in service due to hysteresis and eventual fatigue of the springs, particularly the tube mounting springs. In addition, the system is subject to misalignment in service and also the springs may become dislocated from their mountings in practical operation of this apparatus.

In the present invention, an improved tube suspension system has been developed for suspending a plurality of vertically oriented tubes in a linear bank, within the furnace enclosure or container of a fluid heater such as a hydrocarbon reform furnace. When the fluid heater is a hydrocarbon reform furnace, or in other specialized applications, the tubes will be filled with solid catalyst granules. In the more generalized case of a fluid heater for hydrocarbon cracking or similar usages, the tubes will be empty. The tubes are rigidly mounted at one end, which will be designated as the lower end in the apparatus description infra, although the apparatus assemblage of the present invention is equally applicable to rigid mounting of the upper tube ends combined with lower suspension in accordance with the present invention. With the tubes in the linear bank being rigidly mounted at their lower ends, the upper ends of the tubes are attached to the tube suspension system of the present invention. In this case, a first plurality of pulleys is provided, with each one of the first plurality of pulleys being disposed above the upper end of one of the tubes. A connection rod is provided between each upper tube end and the corresponding pulley, to attach the upper tube end to the pulley and thereby provide tension on the tube. A second plurality of pulleys is disposed above the first plurality of pulleys, with each one of the second plurality of pulleys being in proximity to two adjacent pulleys of the first plurality of pulleys. Means are provided to support the second plurality of pulleys external to the container, such as a fixed support member adjacent to the second plurality of pulleys, combined with individual connection rods extending between the fixed support member and the individual pulleys. A connecting cable is provided, which extends alternately below each of the first plurality of pulleys and above each of the second plurality of pulleys, with the cable alternately engaging one of the first plurality of pulleys and one of the second plurality of pulleys. Means are provided to maintain the cable under tension. This is preferably accomplished by attaching a freely suspended weight to one end of the cable and attaching the other end of the cable to a fixed support element. Because of the cable tension, a uniform and equal upward force is exerted on all of the tubes, and the tubes are continuously maintained in tension when the furnace container is at an elevated temperature. Means are provided to pass a fluid into the tubes to be heated. In the case of a hydrocarbon reform furnace, the fluid is a gaseous mixture of steam and fluid hydrocarbon. Means are also provided to remove the heated fluid, such as a reformed gas mixture, from the tubes. Finally, heating means are disposed within the furnace container to externally heat the tubes. As discussed supra, the heating means will preferably consist of a plurality of hydrocarbon burners disposed within the container, together with means to pass a fluid hydrocarbon fuel and air to the burners and means to remove the resulting flue gas from the container. Alternatively, electric resistance-type heaters or similar heating means may be provided.

The apparatus combination of the present invention provides several important advantages. Each tube in the tube bank expands lengthwise when heated. The present apparatus provides a constant force or pull on the tubes and maintains the tubes under constant and equal tension during expansion. In addition, an equal tension is provided on all of the tubes, regardless of the fact that the tubes expand differentially and in different amounts due to thermal elongation. Another advantage of the present invention is that the apparatus assemblage allows each tube to expand independently and differentially in service, since even under well balanced heating conditions the tubes will expand by different amounts. A further advantage is that the tubes are always maintained in tension, thereby preventing sagging or buckling in service which could lead to the possibility of tube failure. Another advantage is that the apparatus is relatively simple to install and maintain in service, and is considerably lower in cost compared to prior art tube suspension systems such as the springs system of U.S. Patent No. 3,172,739 mentioned supra.

It is an object of the present invention to provide an improved tube suspension system for vertical tubes in a fluid heater.

Another object is to provide an improved and simplified tube suspension system for a vertical linear bank of tubes in a hydrocarbon reform furnace.

A further object is to provide a tube suspension system for vertical tubes in a fluid heater which provides constant and equal tension to all of the tubes regardless of thermal elongation.

An additional object is to provide a tube suspension system for vertical tubes in a fluid heater which provides uniform tension to all of the tubes regardless of differential thermal expansion.

Another object is to provide a tube suspension system for vertical tubes in a fluid heater which maintains the tubes under tension in service and thereby prevents tube buckling or sagging.

An object is to provide an improved tube suspension system for vertical tubes in a fluid heater wherein the tubes are suspended from a plurality of pulleys which serve to provide equal and constant support for all of the tubes regardless of thermal deformation in service.

Figure 2:
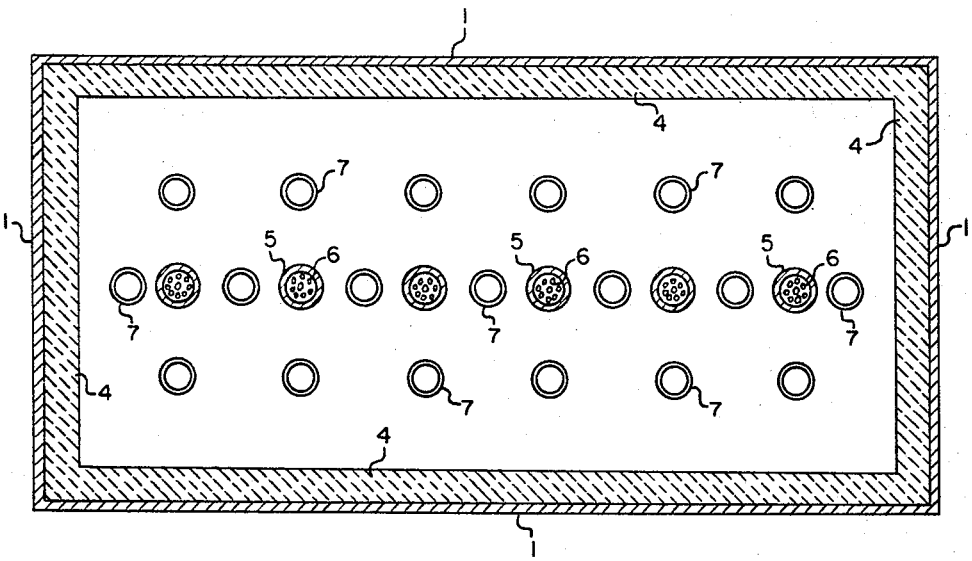

These and other objects and advantages of the present invention will become evident from the description which follows. Referring to the figures, a preferred embodiment of the apparatus of the present invention is illustrated, in which the improved tube suspension system is provided for a hydrocarbon reform furnace which accomplishes the primary steam reforming of a fluid hydrocarbon. FIGURE 1 is an overall elevation view of the furnace and tube suspension system, and FIGURE 2 is a sectional view of FIGURE 1, taken on section 2—2.

The reform furnace structure consists of an enclosure which is usually provided with an internal lining of refractory material. Thus, referring to FIGURE 1, the furnace consists of vertical walls 1, horizontal roof 2 and floor 3, which are internally lined with refractory lining 4. A plurality of vertically oriented reformed tubes 5 are disposed within the furnace enclosure, and tubes 5 are aligned in parallel in a linear row or bank of tubes. The tubes 5 are internally packed with catalyst particles 6, which will usually consist of nickel or cobalt deposited on a suitable carrier such as alumina or kaolin, and which serve to accomplish the catalytic steam reforming of a fluid hydrocarbon at elevated temperature in the conventional reform reaction, to produce synthesis gas containing carbon monoxide and hydrogen. The tubes 5 are externally heated by means of burners 7 which are disposed in the floor 3. Combustion air and a fluid hydrocarbon fuel are passed to burners 7 via streams 8, and the resulting exothermic combustion of the hydrocarbon fuel within the furnace enclosure provides an elevated internal temperature and generates a flue gas which is discharged via upper outlet conduit 9 as stream 10.

The tubes 5 are rigidly mounted at their lower ends to prevent vertical movement and also to provide partial tube support. This mounting is accomplished by attaching lower tube flanges 11 to floor 3. The input process feed stream 12, consisting in this preferred embodiment of a gaseous mixture of steam and a fluid hydrocarbon such as methane or vaporized naphtha, is passed via lower distribution conduit 13 into individual tube inlet conduits 14, which pass the feed stream 12 through flanges 11 and into the tubes 5. The feed stream 12 reacts at elevated temperature in tubes 5, passing upwards within the tubes 5 and in contact with catalyst particles 6. The resulting reformed gas mixture is discharged from tubes 5 via upper side outlets 15 as streams 16, which are combined and passed to further processing as required, not shown, to produce a final synthesis gas or hydrogen.

The tubes 5 are extended through the roof 2, and thus may freely expand upwards to compensate for thermal elongation in service. Closure flanges 17 are provided at the upper ends of the tubes 5, to seal the upper ends of the tubes against fluid flow and also to provide a convenient element for attachment of the tube suspension system of the present invention. A group of circular pulleys 18 is suspended above the tubes 5, with an individual pulley 18 being provided above each tube 5. Connection rods 19 extend between the centers of pulleys 18 and the flanges 17, and serve to transmit upward vertical force to the tubes 5 from the pulleys 18, thus maintaining the tubes 5 under tension. A second group of circular pulleys 20 is suspended above the first group of pulleys 18, with each of the pulleys 20 being disposed in proximity to two adjacent pulleys 18. The pulleys 20 are rigidly supported external to the furnace structure, preferably by attachment to fixed support member 21 which may be a structural member of the furnace container structure. In this case, connection rods 22 are provided, extending between member 21 and the centers of pulleys 20 and rigidly supporting the pulleys 20 against vertical movement. A connecting cable 23 is provided to complete the pulley assemblage and transmit force through the pulley system. Cable 23 extends alternately below each of the first group of pulleys 18 and above each of the second group of pulleys 20, and alternately engages a pulley 18 and a pulley 20. The cable 23 is maintained under tension, perferably by attaching one end of cable 23 to fixed support element 24, and by extending the other end of cable 23 over pulley 25 and attaching freely suspended weight 26 to the free end of cable 23. A connection rod 27 is provided between the center of pulley 25 and fixed support member 21.

In operation of the furnace and tube suspension, the weight 26 suspended freely from the free end of cable 23 exerts a force on the cable 23 equal to the weight of element 26. This force maintains the cable 23 under tension, and is equally and uniformly transmitted through the length of the cable 23. Thus, a force equal to twice the weight of element 26 is exerted by the cable 23 on each of the pulleys 18, assuming friction to be negligible. This force will be continuously exerted on each of the pulleys 18 by the cable 23, regardless of vertical displacement of the pulleys 18. An identical force equal to twice the weight of element 26 will thus be transmitted through rods 19 and exerted on the tubes 5. Because of the heating of the tubes 5 in service, the tubes 5 will expand upwards through the roof 2. The tube suspension system serves to maintain a continuous and equal support force on each of the tubes 5 regardless of vertical displacement, and also regardless of differential thermal elongation of the tubes relative to each other, due to unequal heating effects. As discussed supra, a continuous, constant, and equal force will be exerted on each of the tubes 5, in spite of vertical displacement of the tubes, because the tension of the cable 23 is uniform throughout its length, and therefore the force exerted by the cable 23 on each of the pulleys 18 will be identical, and will be constant regardless of vertical displacement of the pulleys 18.

FIGURE 2 is a sectional plan view of the furnace structure, taken on section 2—2 of FIGURE 1. The parallel arrangement of the tubes 5 in a linear row or bank of tubes is shown, as well as an arrangement of the burners 7 in the floor of the furnace.

Numerous alternatives within the scope of the present invention will occur to those skilled in the art. Thus, burners 7 have been illustrated as being disposed in the floor 3 of the furnace container. Additional burners may be disposed in the vertical walls 1, to provide more complete heating of the tubes 5 throughout their entire length. As mentioned supra, the burners 7 may alternatively be replaced by electric resistance-type heating elements or other heating means.

The tubes 5 may alternatively be rigidly mounted at their upper ends, with the tube suspension system being attached to the lower ends of the tubes 5. In this case, the lower ends of the tubes 5 would preferably extend downwards through the floor 3, with lower attachment of the pulleys of the tube suspension system below the floor 3.

The tubes 5 have been shown in FIGURE 1 with their upper ends extending upwards through the roof 2 and terminating external to the furnace. Alternatively, the upper ends of tubes 5 may terminate within the furnace structure and below roof 2, in which case rods 19 would be extended downwards through openings in roof 2 for attachment to the upper ends of tubes 5 within the furnace. In this case, rods 19 would be fabricated of heat-resistant alloy steel or other suitable material.

Various alternatives are evident with respect to the pulley system which serves as the tube suspension. Thus, one end of cable 23 is attached to rigid support element 24, however cable 23 could also be attached to the main support member 21. It would also be feasible to eliminate support element 24 and attach both ends of cable 23 to freely suspended weights similar to element 26, in which case an additional rigidly mounted pulley similar to pulley 25 would also be provided. Other means for providing tension in cable 23 may also be provided in suitable instances, however the provision of a freely suspended weight attached to at least one end of cable 23 is a preferred embodiment of the invention since this is the simplest means of providing constant tension on the cable regardless of displacement.

Other means of rigidly suspending the pulleys 20 and 25 besides connecting rods 22 and 27 attached to rigid support member 21 may be provided in some cases. Thus, the pulleys 20 and 25 could be directly attached to a rigid support member disposed adjacent to their centers or axes of rotation, with direct connection by means of pins or shafts.

It will be apparent that in its broadest embodiment the apparatus of the present invention is applicable to fluid heaters in general, such as the hydrocarbon cracking furnaces employed in the pyrolysis of fluid hydrocarbons to produce ethylene or propylene-containing gas streams. In this case, the tubes 5 would be free of solid catalyst.

Finally, the apparatus has been shown as applied to a single linear row or bank of vertical tubes. In practice, several parallel linear banks of tubes are usually provided, with all of the banks being aligned in parallel in a single furnace or heater having a rectangular horizontal cross-section. In this case, separate tube suspensions in accordance with the present invention will be provided for each bank of tubes. In addition, the linear banks of tubes may alternatively be radially disposed in a furnace having a circular horizontal cross-section with a vertically extending cylindrical configuration, as illustrated in U.S. Patent No. 3,172,139. In this case, individual tube suspension systems in accordance with the present invention may also be provided above each linear radial bank of tubes.

What is claimed is:

1. An apparatus for heating a fluid which comprises a furnace container, at least one linear bank of tubes vertically disposed within said container, one end of each of said tubes being rigidly mounted whereby substantial vertical motion to accommodate thermal tube expansion is prevented, a first plurality of pulleys, each of said first plurality of pulleys being disposed adjacent to the unmounted other end of one of said tubes and external to said container, a plurality of connection rods, each of said connection rods extending between one of said first plurality of pulleys and the adjacent unmounted end of one of said tubes, a second plurality of pulleys, each of said second plurality of pulleys being disposed in proximity to two adjacent pulleys of said first plurality of pulleys, means to support said second plurality of pulleys external to said container, a connecting cable extending between said first plurality of pulleys and said second plurality of pulleys, said cable alternately engaging one of said first plurality of pulleys and one of said second plurality of pulleys, means to maintain said cable under tension, whereby said tubes are continuously maintained in tension when said furnace container is at an elevated internal temperature, means to pass a fluid into said tubes, means to remove heated fluid from said tubes, and heating means disposed within said container to externally heat said tubes.

2. Apparatus of claim 1, in which said means to support said second plurality of pulleys external to said container comprises a fixed support member external to said container and adjacent to said second plurality of pulleys, together with a second plurality of connection rods, each of said second plurality of connection rods extending between one of said second plurality of pulleys and said fixed support member.

3. Apparatus of claim 2, in which said fixed support member comprises a structural member attached to said container.

4. Apparatus of claim 1, in which said means to maintain said cable under tension comprises a freely suspended weight attached to one end of said cable, the other end of said cable being attached to fixed support element.

5. Apparatus of claim 1, in which said heating means disposed within said container to externally heat said tubes comprises a plurality of hydrocarbon burners, together with means to pass a fluid hydrocarbon and air to said burners, and means to remove flue gas from said container.

6. An apparatus for heating a fluid which comprises a furnace container, at least one linear bank of tubes vertically disposed within said container, the lower end of each of said tubes being rigidly mounted whereby substantial vertical motion to accommodate thermal tube expansion is prevented, a first plurality of pulleys, each of said first plurality of pulleys being disposed above the upper end of one of said tubes and external to said container, a plurality of connection rods, each of said connection rods extending between one of said first plurality of pulleys and the adjacent upper end of one of said tubes, a second plurality of pulleys above said first plurality of pulleys, each of said second plurality of pulleys being disposed in proximity to two adjacent pulleys of said first plurality of pulleys, means to support said second plurality of pulleys external to said container, a connecting cable extending alternatively below each of said first plurality of pulleys and above each of said second plurality of pulleys, said cable alternately engaging one of said first plurality of pulleys and one of said second plurality of pulleys, means to maintain said cable under tension, whereby said tubes are continuously maintained in tension when said furnace container is at an elevated internal temperature, means to pass a fluid into said tubes, means to remove heated fluid from said tubes, and heating means disposed within said container to externally heat said tubes.

7. An apparatus for heating a fluid which comprises a furnace container, at least one linear bank of tubes vertically disposed within said container, the lower end of each of said tubes being rigidly mounted whereby substantial vertical motion to accommodate thermal tube expansion is prevented, the upper end of each of said tubes extending through the top of said container, a first plurality of pulleys, each of said first plurality of pulleys being disposed above the upper end of one of said tubes, a first plurality of connection rods, each of said first plurality of connection rods extending between one of said first plurality of pulleys and the adjacent upper end of one of said tubes, a second plurality of pulleys above said first plurality of pulleys, each of said second plurality of pulleys being disposed in proximity to two adjacent pulleys of said first plurality of pulleys, a fixed support member external to said container and adjacent to said second plurality of pulleys, a second plurality of connection rods, each of said second plurality of connection rods extending between one of said second plurality of pulleys and said fixed support member, a connecting cable extending alternately below each of said first plurality of pulleys and above each of said second plurality of pulleys, said cable alternately engaging one of said first plurality of pulleys and one of said second plurality of pulleys, means to maintain said cable under tension, whereby said tubes are continuously maintained in tension when said furnace container is at an elevated internal temperature, means to pass a fluid into said tubes, means to remove heated fluid from said tubes, and heating means disposed within said container to externally heat said tubes.

8. Apparatus of claim 7, in which said fixed support member comprises a structural member attached to said container.

9. Apparatus of claim 7, in which said means to maintain said cable under tension comprises a freely suspended weight attached to one end of said cable, the other end of siad cable being attached to a fixed support element.

10. Apparatus of claim 7, in which said heating means disposed within said container to externally heat said tubes comprises a plurality of hydrocarbon burners, together with means to pass a fluid hydrocarbon and air to said burners, and means to remove flue gas from said container.

11. Hydrocarbon reform furnace apparatus with improved catalyst tube suspension, comprising a furnace container, at least one linear bank of catalyst-filled reform tubes vertically disposed within said container, the lower end of each of said tubes being rigidly mounted whereby substantial vertical motion to accommodate thermal tube expansion is prevented, a first plurality of pulleys, each of said first plurality of pulleys being disposed above the upper end of one of said tubes and external to said container, a plurality of connection rods, each of said connection rods extending between one of said first plurality of pulleys and the adjacent upper end of one of said tubes, a second plurality of pulleys above said first plurality of pulleys, each of said second plurality of pulleys being disposed in proximity to two adjacent pulleys of said first plurality of pulleys, means to support said second plurality of pulleys external to said container, a connecting cable extending alternately below each of said first plurality of pulleys and above each of said second plurality of pulleys, said cable alternately engaging one of said first plurality of pulleys and one of said second plurality of pulleys, means to maintain said cable under tension, whereby said tubes are continuously maintained in tension when said furnace container is at an elevated internal temperature, means for passing a gaseous mixture comprising steam and fluid hydrocarbon into said tubes, whereby said mixture is catalytically reformed to synthesis gas, means to remove the resulting synthesis gas stream from said tubes, and heating means disposed within said container to externally heat said tubes.

12. Apparatus of claim 11, in which the upper end of each of said tubes extends through the top of said container.

13. Apparatus of claim 11, in which said means to support said second plurality of pulleys external to said container comprises a structural member externally attached to said container and adjacent to said second plurality of pulleys, together with a second plurality of connection rods, each of said second plurality of connection rods extending between one of said second plurality of pulleys and said structural member.

14. Apparatus of claim 11, in which said means to maintain said cable under tension comprises a freely suspended weight attached to one end of said cable, the other end of said cable being attached to a fixed support element.

15. Apparatus of claim 11, in which said heating means disposed within said container to externally heat said tubes comprises a plurality of hydrocarbon burners, together with means to pass a fluid hydrocarbon and air to said burners, and means to remove flue gas from said container.

References Cited

UNITED STATES PATENTS 3,195,989    7/1965    Pyzel _____ 23—288

JOSEPH SCOVRONEK, *Primary Examiner.*

U.S. Cl. X.R.

23—284; 122—510; 248—331